United States Patent
Kim et al.

(10) Patent No.: US 12,107,269 B2
(45) Date of Patent: Oct. 1, 2024

(54) SULFUR-CARBON COMPOSITE, METHOD FOR PRODUCING SAME, AND POSITIVE ELECTRODE FOR LITHIUM-SULFUR BATTERY AND LITHIUM-SULFUR BATTERY WHICH COMPRISE SAME

(71) Applicant: LG CHEM, LTD., Seoul (KR)

(72) Inventors: Soohyun Kim, Daejeon (KR); Kwonnam Sohn, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 698 days.

(21) Appl. No.: 17/052,307

(22) PCT Filed: Jun. 4, 2019

(86) PCT No.: PCT/KR2019/006705
§ 371 (c)(1),
(2) Date: Nov. 2, 2020

(87) PCT Pub. No.: WO2020/009333
PCT Pub. Date: Jan. 9, 2020

(65) Prior Publication Data
US 2021/0242463 A1    Aug. 5, 2021

(30) Foreign Application Priority Data

Jul. 2, 2018 (KR) .......................... 10-2018-0076514

(51) Int. Cl.
*H01M 4/583* (2010.01)
*H01M 4/04* (2006.01)
(Continued)

(52) U.S. Cl.
CPC ......... *H01M 4/583* (2013.01); *H01M 4/0404* (2013.01); *H01M 4/0433* (2013.01);
(Continued)

(58) Field of Classification Search
CPC .... H01M 4/136; H01M 4/137; H01M 4/1393; H01M 4/1397; H01M 4/1399;
(Continued)

(56) References Cited

U.S. PATENT DOCUMENTS

2004/0029014 A1    2/2004  Hwang et al.
2013/0244097 A1*   9/2013  Leitner ................. H01M 4/133
                                                     429/188
(Continued)

FOREIGN PATENT DOCUMENTS

CN    104170128 A    11/2014
CN    105431969 A    3/2016
(Continued)

OTHER PUBLICATIONS

English translation of KR 2002-0018395 A obtained from Global Dossier (Year: 2002).*

(Continued)

*Primary Examiner* — Christopher P Domone
*Assistant Examiner* — Kimberly Wyluda
(74) *Attorney, Agent, or Firm* — Birch, Stewart, Kolasch & Birch, LLP (57) ABSTRACT

A sulfur-carbon composite including a porous carbon material; a coating layer on a surface of the porous carbon material, the coating layer including a compound with electrolyte solution impregnation property; and sulfur, a method for preparing the same, and a positive electrode for a lithium-sulfur battery and a lithium-sulfur battery including the same are disclosed.

12 Claims, 4 Drawing Sheets

(51) Int. Cl.
| | |
|---|---|
| *H01M 4/136* | (2010.01) |
| *H01M 4/137* | (2010.01) |
| *H01M 4/1393* | (2010.01) |
| *H01M 4/1399* | (2010.01) |
| *H01M 4/36* | (2006.01) |
| *H01M 4/62* | (2006.01) |
| *H01M 4/66* | (2006.01) |
| *H01M 10/36* | (2010.01) |
| *H01M 50/417* | (2021.01) |
| *H01M 4/02* | (2006.01) |
| *H01M 4/1397* | (2010.01) |

(52) U.S. Cl.
CPC ......... *H01M 4/0471* (2013.01); *H01M 4/136* (2013.01); *H01M 4/366* (2013.01); *H01M 4/622* (2013.01); *H01M 4/661* (2013.01); *H01M 10/36* (2013.01); *H01M 50/417* (2021.01); *H01M 2004/021* (2013.01); *H01M 2004/028* (2013.01); *H01M 4/137* (2013.01); *H01M 4/1393* (2013.01); *H01M 4/1397* (2013.01); *H01M 4/1399* (2013.01)

(58) Field of Classification Search
CPC .. H01M 4/583; H01M 4/0404; H01M 4/0433; H01M 4/366; H01M 4/622; H01M 4/661; H01M 10/36; H01M 50/417; H01M 2004/021; H01M 2004/028
See application file for complete search history.

(56) References Cited

U.S. PATENT DOCUMENTS

| | | |
|---|---|---|
| 2015/0044550 A1 | 2/2015 | Park et al. |
| 2016/0164103 A1 | 6/2016 | Son et al. |
| 2016/0181600 A1 | 6/2016 | Omoda et al. |
| 2016/0190561 A1 | 6/2016 | Son et al. |
| 2019/0067682 A1 | 2/2019 | Cho et al. |
| 2019/0245203 A1 | 8/2019 | Cho et al. |
| 2020/0280052 A1* | 9/2020 | Cho .................... H01M 10/052 |

FOREIGN PATENT DOCUMENTS

| | | | |
|---|---|---|---|
| CN | 111357136 A | | 3/2020 |
| JP | 2004-47405 A | | 2/2004 |
| JP | 2004-71566 A | | 3/2004 |
| JP | 2018-119165 A | | 6/2016 |
| JP | 2018-528692 A | | 9/2018 |
| JP | 2019-509613 A | | 4/2019 |
| KR | 2002-0018395 A | * | 3/2002 |
| KR | 10-2004-0013585 A | | 2/2004 |
| KR | 10-2005-0038899 A | | 4/2005 |
| KR | 10-2015-0015644 A | | 2/2015 |
| KR | 10-2015-0016091 A | | 2/2015 |
| KR | 10-2015-0017580 A | | 2/2015 |
| KR | 10-2016-0038724 A | | 4/2016 |
| KR | 10-2016-0051056 A | | 5/2016 |
| KR | 10-2016-0134092 A | | 11/2016 |
| KR | 10-2018-0017724 A | | 2/2018 |
| KR | 10-2018-0048309 A | | 5/2018 |
| KR | 10-2019-0050424 A | | 5/2019 |
| WO | WO 2018/030686 A1 | | 2/2018 |

OTHER PUBLICATIONS

International Search Report for PCT/KR2019/006705 mailed on Sep. 9, 2019.

Extended European Search Report for European Application No. 19830666.4, dated Jun. 25, 2021.

* cited by examiner

SULFUR-CARBON COMPOSITE, METHOD FOR PRODUCING SAME, AND POSITIVE ELECTRODE FOR LITHIUM-SULFUR BATTERY AND LITHIUM-SULFUR BATTERY WHICH COMPRISE SAME

TECHNICAL FIELD

The present application claims priority to and benefits of Korean Patent Application No. 10-2018-0076514 filed on Jul. 2, 2018, the entire disclosure of which are incorporated herein by reference its entirety.

The present invention relates to a sulfur-carbon composite, and a positive electrode for a lithium-sulfur battery and a lithium-sulfur battery comprising the same.

BACKGROUND ART

Recently, as the miniaturization, the weight lightening, and the high performance electronic devices and communication devices are rapidly progressing and the need for electric vehicles has been greatly increased in relation to environmental problems, there is also a growing demand for performance and lifetime improvements in the secondary battery used as energy sources for these products. A lithium-sulfur battery using sulfur-based compound as a positive electrode active material is attracting attention as a secondary battery that satisfies this demand.

The lithium-sulfur battery is a secondary battery that uses a sulfur-based compound comprising a sulfur-sulfur bond as a positive electrode active material and uses a carbon-based material which is capable of intercalating/deintercalating lithium metal or lithium ion, or silicon or tin etc. which forms an alloy with lithium, as a negative electrode active material.

During the discharging of the lithium-sulfur battery, at the positive electrode, sulfur accepts the electrons and thus the reduction reaction proceeds, and at the negative while lithium is electrode, oxidation reaction occurs ionized. Specifically, sulfur before discharging has an annular $S_8$, and during the reduction reaction (discharging), as the sulfur-sulfur bond is cut off, the oxidation number of sulfur decreases, and during the oxidation reaction (charging), as the sulfur-sulfur bond is re-formed, electrical energy is stored and generated using an oxidation-reduction reaction in which the oxidation number of sulfur increases.

In particular, the theoretical discharging capacity of the lithium-sulfur battery is 1,675 mAh/g, and its theoretical energy density is 2,600 Wh/kg. Since the theoretical energy density of the lithium-sulfur battery is about 5 times higher than that of the lithium ion battery (about 570 Wh/kg) currently under study, the lithium-sulfur battery is a battery capable of realizing high capacity, high energy density and long life. In addition, since sulfur, which is a main material of the positive electrode active material, has a low atomic weight, is rich in resources, is easy to supply, is cheap, is non-toxic, and is an environmentally friendly substance, the lithium-sulfur battery can be used as a source of energy for medium to large-sized devices such as electric vehicles as well as portable electronic devices and thus are being studied extensively.

Since sulfur used as a positive electrode active material in a lithium-sulfur battery has an electric conductivity of $5 \times 10^{-30}$ S/cm, which is a nonconductor having no electrical conductivity, and thus there is a problem that it is difficult to transfer electrons generated by an electrochemical reaction. Therefore, sulfur is composited into a sulfur-carbon composite in combination with a conductive material such as carbon capable of providing an electrochemical reaction site and then used.

Meanwhile, during the actual operation of the lithium-sulfur battery, as the cycles progress, since the initial capacity and the cycle lifetime are rapidly decreased and thus sufficient performance cannot be secured, lithium-sulfur battery has not yet been commercialized. This is due to the fact that sulfur which is a positive electrode active material expands in its volume due to the reduction reaction, or lithium polysulfides which are intermediate products during the reduction reaction are leached into the electrolyte solution, so that sulfur is lost and no longer participates in the charging/discharging reaction of the battery. Therefore, various techniques for improving the stability and electrochemical reactivity of the sulfur-carbon composite have been proposed.

However, in order to maintain the low porosity of the positive electrode of the lithium-sulfur battery comprising the sulfur-carbon composite as a positive electrode active material, the positive electrode is rolled, but there is a problem that the adhesive force between the positive electrode active material and the current collector is lowered during rolling. Also, problems of the dissolution of lithium polysulfide and the wetting of the electrolyte solution occurred, and thus there is a problem that the performance of the battery deteriorates because the reactivity is significantly lowered at the initial and high rate charging/discharging. The above problems are still not solved.

Therefore, it is necessary to develop a sulfur-carbon composite which has excellent adhesive force of the positive electrode active material to the current collector even in the case of the electrode with low porosity and is capable of forming migration path of the electrolyte solution because of high electrolyte solution impregnation property.

PRIOR ART DOCUMENT

Patent Document

Korean Patent Publication No. 10-2015-0015644.

DISCLOSURE

Technical Problem

It is an object of the present invention to provide a sulfur-carbon composite capable of improving the lifetime characteristic of the lithium-sulfur battery comprising the positive electrode with low porosity.

In addition, it is another object of the present invention to provide a positive electrode for a lithium-sulfur battery comprising the sulfur-carbon composite which has excellent adhesive force of the positive electrode active material to the current collector when manufacturing the positive electrode with low porosity.

In addition, it is another object of the present invention to provide a lithium-sulfur battery comprising the positive electrode for the lithium-sulfur battery.

Technical Solution

In order to achieve the above objects, the present invention provides a sulfur-carbon composite comprising a porous carbon material; a coating layer on a surface of the porous carbon material, the coating layer comprising a compound having electrolyte solution impregnation property; and sulfur.

In addition, the present invention provides a method for preparing a sulfur-carbon composite comprising the steps of:
(a) coating a porous carbon material with a compound having electrolyte solution impregnation property; and
(b) mixing and molding the porous carbon material coated with the compound having electrolyte solution impregnation property prepared in step (a) and sulfur.

In addition, the present invention provides a positive electrode for lithium-sulfur battery comprising a positive electrode current collector; and a positive electrode active material layer on the positive electrode current collector, wherein the positive electrode active material layer comprises the sulfur-carbon composite of the present invention, a conductive material, and a binder.

In addition, the present invention provides a lithium-sulfur battery comprising a positive electrode; a negative electrode; a separator interposed between the positive electrode and the negative electrode; and an electrolyte solution, wherein the positive electrode is the positive electrode of the present invention.

Advantageous Effects

The sulfur-carbon composite of the present invention facilitates the movement of lithium ions by having a coating layer comprising a compound with electrolyte solution impregnation property on the porous carbon material and thus forming a migration path of an electrolyte solution, so that the performance and lifetime characteristics of a lithium-sulfur battery comprising a positive electrode with low porosity can be improved, and the adhesive force to the positive electrode current collector can be improved.

BEST MODE

Hereinafter, the present invention will be described in more detail.

The term "composite" as used herein refers to a material that two or more materials are combined to express a more effective function while forming physically and chemically different phases to each other.

The term "electrolyte solution impregnation property" or "electrolyte solution impregnation ability" as used herein refers to the ability to carry and hold the electrolyte solution, and is distinguished from temporary contact or taking of the relevant substance or ingredient in that it impregnates the electrolyte solution homogeneously over a long period of time.

The lithium-sulfur battery various secondary batteries is gaining popularity as a next-generation battery, due to the advantages that the lithium-sulfur battery has high discharge capacity and theoretical energy density, and sulfur, which is used as a positive electrode active material, is abundant in reserves, low cost, and environmentally friendly.

However, in the lithium-sulfur battery, sulfur is converted from the cyclic $S_8$ structure to the linear structure of lithium polysulfides ($Li_2S_x$, x=8, 6, 4, 2) by the reduction reaction and eventually, when the lithium polysulfides are completely reduced, lithium sulfide ($Li_2S$) is finally produced. Among the lithium polysulfides which are intermediate products of the reduction reaction of sulfur, lithium polysulfide with high oxidation number of sulfur ($Li_2S_x$, usually x>4) is a strong polar material that is easily dissolved in an electrolyte solution containing a hydrophilic organic solvent and is leached out of the reaction zone of the positive electrode, so that it is no longer able to participate in the electrochemical reaction. Also, sulfur is changed into lithium sulfide ($Li_2S$) that is a discharging product, resulting in a volume expansion of about 80%, and as a result, there is a problem that the pore volume inside the positive electrode is reduced and contact with the electrolyte solution becomes difficult. In addition, the electrolyte solution is decomposed and consumed due to formation of a passivation layer (Solid Electrolyte Interphase: SEI) or reaction with impurities during the operation of the battery.

Since the amount of sulfur involved in the electrochemical reaction is low, along with this loss of sulfur and electrolyte solution and large change in the volume of the positive electrode, not only the lithium-sulfur battery cannot realize all of the theoretical capacity and the energy density in actual operation in spite of the advantages described above, but also there is a problem that the deterioration of the initial capacity and cycle characteristics is accelerated after a certain cycle.

In order to improve the electrical conductivity of sulfur, a method of forming a composite with or coating a conductive material such as carbon or polymer has been used. Among various methods, since the sulfur-carbon composite is effective in improving the electrical conductivity of the positive electrode, the sulfur-carbon composite is most commonly used as a positive electrode active material. However, it is still insufficient in terms of charging/discharging capacity and efficiency.

In addition, the lithium-sulfur battery comprising the electrode with low porosity manufactured by rolling has a problem that lithium ions are not easily migrated and thus the reactivity is greatly lowered at initial and high rate charging/discharging. In addition, the electrode with low porosity manufactured by rolling has a problem that the positive electrode active material layer detaches from the electrode due to a weak adhesive force between the current collector and the positive electrode active material layer, thereby being difficult to manufacture the electrode.

Therefore, by forming a coating layer containing a compound with electrolyte solution impregnation property on the surface of the porous carbon material and thus providing a function capable of impregnating the electrolyte solution between the sulfur and the carbon material, thereby forming migration paths of the electrolyte solution in the sulfur-carbon composite and thus facilitating the movement of lithium ions, the present invention is intended to provide a sulfur-carbon composite which is capable of improving the lifetime characteristic of the lithium-sulfur battery comprising the positive electrode with low porosity and has excellent adhesive force to the current collector even in the positive electrode with low porosity.

That is, the present invention relates to a sulfur-carbon composite comprising a porous carbon material; a coating layer on a surface of the porous carbon material, the coating layer comprising a compound with electrolyte solution impregnation property; and sulfur.

The porous carbon material of the present invention comprises the coating layer containing the compound with electrolyte solution impregnation property on its surface. The electrolyte solution impregnated with the compound having electrolyte solution impregnation property maintains a stable interface inside the sulfur-carbon composite, that is, between the sulfur and the carbon material. Accordingly, the accessibility of the electrolyte solution to the inside of the active material is improved and the electrochemical reactivity of the sulfur can be increased by the help of the electrolyte solution. Particularly, due to the polymer having the electrolyte solution impregnation property even in the lithium-sulfur battery comprising the positive electrode with low porosity, the migration path of the electrolyte solution is formed in the sulfur-carbon composite to facilitate the migration of lithium ions, thereby maintaining the reactivity of the lithium-sulfur battery and improving the lifetime characteristic thereof. In addition, due to the coating layer, it is possible to improve the adhesive force of the positive electrode active material to the current collector even in the case of the positive electrode with low porosity, so that the problems such as detachment of the positive electrode active material in the rolling process for manufacturing the electrode with low porosity can be solved, thereby facilitating manufacture of the positive electrode with low porosity.

In the present invention, the low porosity means that the porosity is 68% or less.

The sulfur-carbon composite means that the porous carbon material, in which the coating layer is formed, and the sulfur are in a mixed state.

In the present invention, the compound with electrolyte solution impregnation property is not miscible with the electrolyte solution or the solvent used in the preparation of the slurry for the positive electrode, and the compound may have at least one form selected from the group consisting of polymer, oligomer, and monomolecular forms.

If the compound with electrolyte solution impregnation property is in the form of the polymer, the polymer may comprise at least one selected from the group consisting of polyvinylidene fluoride, polyvinylidene fluoride-hexafluoropropylene, perfluoroalkyl, fluoroethylene propylene, ethylene tetrafluoroethylene, and polytetrafluoroethylene.

In addition, the electrolyte solution comprises a lithium salt and a solvent. In the present invention, the solvent of the electrolyte solution in which the polymer has impregnation ability may comprise at least one selected from the group consisting of an ether-based compound and carbonate-based compound.

The ether-based compound may comprise at least one selected from the group consisting of dimethyl ether, diethyl ether, dipropyl ether, methylethyl ether, methylpropyl ether, ethylpropyl ether, dimethoxyethane, diethoxyethane, methoxyethoxyethane, diethylene glycol dimethyl ether, diethylene glycol diethyl ether, diethylene glycol methylethyl ether, triethylene glycol dimethyl ether, triethylene glycol diethyl ether, triethylene glycol methylethyl ether, tetraethylene glycol dimethyl ether, tetraethylene glycol diethyl ether, tetraethylene glycol methylethyl ether, polyethylene glycol dimethyl ether, polyethylene glycol diethyl ether, polyethylene glycol methylethyl ether, 1,3-dioxolane, tetrahydrofuran, and 2-methyltetrahydrofuran.

The carbonate-based compound may be a cyclic carbonate compound or a linear carbonate compound.

The cyclic carbonate compound may comprise at least one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, vinylethylene carbonate, and halides thereof. Examples of such halides comprise, but are not limited to, fluoroethylene carbonate (FEC) and the like.

In addition, the linear carbonate may comprise, but is not limited to, at least one selected from the group consisting of dimethyl carbonate (DMC), diethyl carbonate (DEC), dipropyl carbonate, ethylmethylcarbonate (EMC), methyl propyl carbonate, and ethyl propyl carbonate.

The lithium salt may be used without limitation as long as it is commonly used in an electrolyte solution for a lithium-sulfur battery. For example, the lithium salt may comprise at least one selected from the group consisting of LiSCN, LiBr, LiI, $LiPF_6$, $LiBF_4$, $LiB_{10}Cl_{10}$, $LiSO_3CF_3$, LiCl, $LiClO_4$, $LiSO_3CH_3$, $LiB(Ph)_4$, $LiC(SO_2CF_3)_3$, $LiN(SO_2CF_3)_2$, $LiCF_3CO_2$, $LiAsF_6$, $LiSbF_6$, $LiAlCl_4$, LiFSI, lithium chloroborane, lithium lower aliphatic carboxylate and the like.

In addition, the concentration of the lithium salt in the electrolyte solution may be 0.2 to 2 M, specifically 0.6 to 2 M, more specifically 0.7 to 1.7 M. If the concentration of the lithium salt is less than 0.2 M, the conductivity of the electrolyte solution may be lowered and the performance of the electrolyte solution may be deteriorated. If the concentration exceeds 2 M, the viscosity of the electrolyte solution may be increased to lower the mobility of the lithium ion.

The electrolyte solution impregnation ability of the polymer having the electrolyte solution impregnation property to the electrolyte solution containing the ether-based compound or the carbonate-based compound as a solvent may be 200% or more, preferably 260 to 600%. At this time, the electrolyte solution impregnation ability can be measured by preparing the membrane using the compound with impregnation electrolyte solution property, and then calculating the weight difference between before and after immersion in the electrolyte solution. Specifically, the compound membrane is prepared by dissolving the compound having an electrolyte solution impregnation property in a suitable solvent, preferably a mixed solvent of ethanol and acetone, casting, and then drying. The prepared compound membrane was immersed at 25° C. for 48 hours to allow the coated compound to be saturated with the electrolyte solution, and the weight at this time was designated as the weight after immersion.

The compound with electrolyte solution impregnation property may be contained in an amount of 0.5 to 5% by weight, preferably 1 to 3% by weight based on the total weight of the sulfur-carbon composite. If the compound is contained in an amount of less than 0.5% by weight, the formation of the coating layer on the porous carbon material is insufficient, so that the lifetime characteristic of the lithium-sulfur battery comprising the positive electrode with low porosity cannot be improved, and the adhesive force of the positive electrode active material to the current collector does not increase in the positive electrode with low porosity. If the compound is contained in an amount exceeding 5% by weight, the function as a positive electrode active material and battery performance may be adversely affected.

The porous carbon material provides a framework in which sulfur which is a positive electrode active material can be uniformly and stably immobilized, and supplements the electrical conductivity of sulfur to enable the electrochemical reaction to proceed smoothly.

The porous carbon material can be generally produced by carbonizing precursors of various carbon materials. The porous carbon material may comprise uneven pores therein, the average diameter of the pores is in the range of 1 to 200 nm, and the porosity may be in the range of 10 to 90% of the total volume of the porosity. If the average diameter of the pores is less than the above range, the pore size is only at the molecular level and impregnation with sulfur is impossible. On the contrary, if the average diameter of the pores exceeds the above range, the mechanical strength of the porous carbon is weakened, which is not preferable for application to the manufacturing process of the electrode.

The shape of the porous carbon material is in the form of sphere, rod, needle, plate, tube, and bulk, and can be used without limitation as long as it is commonly used in a lithium-sulfur battery.

The porous carbon material may have a porous structure or a high specific surface area, and may be any of those conventionally used in the art. For example, the porous carbon material may be, but is not limited to, at least one selected from the group consisting of graphite; graphene; carbon blacks such as Denka black, acetylene black, Ketjen black, channel black, furnace black, lamp black, and thermal black; carbon nanotubes (CNTs) such as single wall carbon nanotube (SWCNT) and multiwall carbon nanotubes (MWCNT); carbon fibers graphite nanofiber (GNF), carbon nanofiber (CNF), and activated carbon fiber (ACF); natural graphite, artificial graphite, expanded graphite, and activated carbon. Preferably, the porous carbon material may be carbon nanotubes.

The sulfur may comprise at least one selected from the group consisting of inorganic sulfur ($S_8$), $Li_2S_n$ ($n\geq 1$), disulfide compound such as 2,5-dimercapto-1,3,4-thiadiazole and 1,3,5-trithiocyanuic acid, an organic sulfur compound, and a carbon-sulfur polymer (($C_2S_x)_n$: X=2.5 to 50, n≥2) and the like. Preferably, inorganic sulfur ($S_8$) can be used.

In the sulfur-carbon composite according to the present invention, the weight ratio of the porous carbon material comprising the coating layer described above and sulfur may be 1:9 to 5:5, preferably 2:8 to 3:7. If sulfur is less than the above range, the amount of the binder required for preparing the slurry for the positive electrode is increased as the content of the porous carbon material is increased. The increase of the amount of the binder eventually increases the sheet resistance of the electrode, and acts as an insulator to block the electron pass, which may degrade the cell performance. On the contrary, if sulfur exceeds the above weight ratio range, since sulfur is agglomerated together and thus it can be difficult for the sulfur to participate directly in the electrode reaction.

Also, in the present invention, the sulfur-carbon composite comprises 50 to 90% by weight of sulfur, 6 to 45% by weight of the porous carbon material and 0.5 to 5% by weight of the compound with electrolyte solution impregnation property relative to the total weight of the sulfur-carbon composite. If the content in the sulfur-carbon composite falls the above range, the lifetime characteristic of the lithium-sulfur battery comprising the positive electrode with low porosity described above can be improved, and the adhesive force of the positive electrode active material to the current collector can be increased.

In the sulfur-carbon composite according to the present invention, sulfur is located on at least one of the inner and outer surfaces of the pores of the porous carbon material, and at this time, sulfur may be present in the area of less than 100%, preferably 1 to 95%, more preferably 60 to 90% of the entire inner and outer surfaces of the porous carbon material. When sulfur is within the above range on the surface of the porous carbon material, it can exhibit the maximum effect in terms of the electron transfer area and the wettability of the electrolyte solution. Specifically, since sulfur is impregnated thinly and evenly on the surface of the porous carbon material in the above range, the electron transfer contact area can be increased during the charging/discharging process. If sulfur is located in the 100% area of the entire surface of the porous carbon material, the porous carbon material is completely covered with sulfur, so that the wettability of the electrolyte solution is deteriorated and the contact property with the electrically conductive material contained in the electrode is decreased, and thus the electrons are not transmitted and it cannot participate in the reaction.

The present invention also relates to a method for preparing the sulfur-carbon composite.

The method for preparing the sulfur-carbon composite according to the present invention comprises the steps of:
 (a) coating a porous carbon material with a compound having electrolyte solution impregnation property; and
 (b) mixing and molding the porous carbon material coated with the compound having electrolyte solution impregnation property prepared in step (a) and sulfur.

The step (a) is a step of forming the coating layer of the compound having electrolyte solution impregnation property on a surface of the porous carbon material, and may be carried out through a process of adding the porous conductive material to the solution in which the compound having electrolyte solution impregnation property is dissolved, stirring the solution, and then filtering and drying the solution, or may be carried out by any method known in the art.

The solvent of the solution in which the compound with electrolyte solution impregnation property is dissolved is not particularly limited as long as it can dissolve the polymer, but it is preferably a mixed solvent of ethanol and acetone.

The step (b) may be carried out through a process of mixing the porous carbon material coated with the compound having electrolyte solution impregnation property and sulfur, and heating and molding the resulted mixture, or may be carried out by any method known in the art.

The mixing is for increasing the mixing degree among the above-described materials and can be carried out by using a stirring apparatus which is conventionally used in the art. At this time, the mixing period of time and the mixing rate can also be selectively controlled depending on the content and condition of the raw materials.

The heating temperature may be a temperature at which sulfur is melted, specifically, 120 to 180° C., preferably 150 to 180° C. If the heating temperature is lower than 120° C., the sulfur is not sufficiently melted and thus the sulfur-carbon composite structure may not be formed properly. If the heating temperature exceeds 180° C., it is difficult to obtain the desired effect because the coated compound does not remain. In addition, the heating period of time can be controlled depending on the content of sulfur.

Through step (b), the sulfur-carbon composites in which the surface of the porous carbon material comprises the coating layer comprising the compound with electrolyte solution impregnation property can be prepared.

The sulfur-carbon composite of the present invention is a sulfur-carbon composite in which a coating layer of the compound with electrolyte solution impregnation property is formed on the surface of the porous carbon material, wherein the sulfur-carbon composite is prepared by mixing the porous carbon material comprising the coating layer and sulfur. Therefore, the sulfur-carbon composite of the present invention can be coated with the polymer having electrolyte solution impregnation property at a higher concentration than the case of coating the compound having electrolyte solution impregnation property after the manufacture of the sulfur-carbon composite, and thus the lithium-sulfur battery comprising the same can exhibit an effect of not generating an overvoltage. In addition, in the case of coating the compound having electrolyte solution impregnation property after the manufacture of the sulfur-carbon composite, the sulfur impregnated in the inside can be eluted to the outside by the solution in which the compound having electrolyte solution impregnation property is dissolved. However, the sulfur-carbon composite of the present invention has stability without causing the above-mentioned problem.

In addition, the present invention relates to a positive electrode for a lithium-sulfur battery comprising a positive electrode current collector; and a positive electrode active material layer on the positive electrode current collector, wherein the positive electrode active material layer comprises the sulfur-carbon composite of the present invention described above, a conductive material, and a binder.

The positive electrode has a low porosity, and the porosity of the positive electrode may be 68% or less, preferably 50 to 68%. By having the porosity as described above, the energy density per volume can be increased and the minimum impregnation amount of the electrolyte solution is reduced, so that the energy density per mass can be increased.

By using the sulfur-carbon composite of the present invention described above, the adhesive force of the positive electrode active material layer to the positive electrode current collector can be 2 gf/cm or more, preferably 2 gf/cm to 15 gf/cm.

In general, when manufacturing the positive electrode with low porosity, the adhesive force between the positive electrode current collector and the positive electrode active material layer is poor, and thus it is not easy to manufacture the electrode, and the activity of the positive electrode is not excellent. However, in the present invention, by using the sulfur-carbon composite comprising the coating layer which contains the compound with electrolyte solution impregnation property on the surface of the porous carbon material, it is also possible to increase the adhesive force between the positive electrode current collector and the positive electrode active material layer even in the positive electrode with low porosity, thereby improving the characteristics of the lithium-sulfur battery. If a sulfur-carbon composite which does not contain the compound with electrolyte solution impregnation property is used, the above effect cannot be achieved because the adhesive force of the positive electrode active material layer to the positive electrode current collector in the positive electrode with low porosity is very poor.

The positive electrode current collector generally has a thickness of 3 to 500 µm and is not particularly limited as long as it has high conductivity without causing chemical changes in the battery. Specifically, an electrically conductive material such as stainless steel, aluminum, copper, or titanium, etc., can be used as the positive electrode current collector. Also, the positive electrode current collector may be formed in various forms such as film, sheet, foil, net, porous body, foam, or nonwoven fabric.

The conductive material is not particularly limited as long as it has electrical conductivity without causing chemical changes in the battery, and carbon black-based materials such as Super-P, Denka black, acetylene black, Ketjen black, channel black, furnace black, lamp black, thermal black, and carbon black; carbon derivatives such as carbon nanotube or fullerene; conductive fibers such as carbon fiber or metal fiber; carbon fluoride; metal powders such as aluminum powder and nickel powder; and conductive polymers such as polyaniline, polythiophene, polyacetylene, and polypyrrole may be used alone or in combination.

The content of the conductive material may be 0.01 to 30% by weight based on the total weight of the mixture comprising the positive electrode active material.

The binder is a component that maintains a positive electrode active material on a positive electrode current collector and has the function of organically connecting between positive electrode active materials. The binder may be, for example, polyvinylidene fluoride, polyvinyl alcohol, carboxymethylcellulose, starch, hydroxypropyl cellulose, regenerated cellulose, polyvinylpyrrolidone, tetrafluoroethylene, polyethylene, polypropylene, ethylene propylene diene rubber (EPDM), sulfonated-EPDM, styrene-butadiene rubber, fluorine rubber, various copolymers thereof and the like.

The content of the binder may be 0.5 to 30% by weight based on the total weight of the mixture comprising the positive electrode active material. If the content of the binder is less than 0.5% by weight, the physical properties of the positive electrode may be deteriorated and the active material and the electrically conductive material in the positive electrode may be detached. If the content of the binder exceeds 30% by weight, the ratio of the active material and the electrically conductive material in the positive electrode may be relatively decreased, thereby reducing the capacity of the battery.

The positive electrode active material layer is formed by forming a positive electrode active material in the form of a slurry, wherein a binder is dissolved in a solvent for preparing a slurry, and then an electrically conductive material is dispersed thereto. The solvent for preparing the slurry is preferably one which can uniformly disperse the positive electrode active material, the binder, and the electrically conductive material, and is easily evaporated. The solvent for preparing the slurry may typically be acetonitrile, methanol, ethanol, tetrahydrofuran, water, isopropyl alcohol, and the like. Next, a slurry for the positive electrode is prepared by uniformly dispersing the sulfur-carbon composite, or the electrically conductive material, optionally along with the additives, to a solvent. The amounts of the solvent contained in the slurry, the sulfur-carbon composite, or optionally the additives are not particularly important in the present application, and are sufficient only if the slurry has an appropriate viscosity to facilitate coating of the slurry.

Thereafter, the positive electrode current collector can be coated with the slurry and then rolled to produce a positive electrode for a lithium-sulfur battery. The slurry may be coated on the current collector in a suitable thickness depending on the viscosity of the slurry and the thickness of the positive electrode to be formed.

After coating the slurry, the slurry may further be dried before rolling, and the drying may be performed at a temperature of about 80° C.

After the drying, a positive electrode is prepared by rolling, and the rolling may be performed by a method known in the art, for example, by a roll pressing method.

In addition, the present invention relates to a lithium-sulfur battery comprising a positive electrode; a negative electrode; a separator interposed between the positive electrode and the negative electrode; and an electrolyte solution, wherein the positive electrode is the positive electrode of the present invention described above.

The negative electrode may be composed of a current collector and a negative electrode active material layer formed on one or both sides thereof. Also, the negative electrode may be a lithium metal plate.

The current collector is for supporting the negative electrode active material and is not particularly limited as long as it is electrochemically stable in the voltage range of the lithium secondary battery while having excellent conductivity. For example, copper, stainless steel, aluminum, nickel, titanium, palladium, sintered carbon; copper or stainless steel surface-treated with carbon, nickel, silver or the like; aluminum-cadmium alloy or the like may be used as the current collector.

The negative electrode current collector can enhance the bonding force with the negative electrode active material by having fine irregularities formed on its surface, and may be formed in various forms such as film, sheet, foil, mesh, net, porous body, foam, or nonwoven fabric.

The negative electrode active material may comprise a material capable of reversibly intercalating or deintercalating lithium ion, a material capable of reacting with lithium ion to reversibly form lithium containing compounds, or lithium metal or lithium alloy.

The material capable of reversibly intercalating or deintercalating lithium ion can be, for example, crystalline carbon, amorphous carbon, or a mixture thereof.

The material capable of reacting with lithium ion to reversibly form lithium containing compounds may be, for example, tin oxide, titanium nitrate or silicon.

The lithium alloy may be, for example, an alloy of lithium (Li) and a metal selected from the group consisting of sodium (Na), potassium (K), rubidium (Rb), cesium (Cs), francium (Fr), beryllium (Be), magnesium (Mg), calcium (Ca), strontium (Sr), barium (Ba), radium (Ra), aluminum (Al), and tin (Sn).

A separator may be further included between the positive electrode and negative electrode described above. The separator separates or insulates the positive electrode and the negative electrode from each other and allows the lithium ion to be transported between the positive electrode and the negative electrode. The separator may be made of a porous nonconductive or insulating material. Such separator may be an independent member such as a film or a coating layer added to the positive electrode and/or the negative electrode.

Materials for forming the separator include, but are not limited to, polyolefins such as polyethylene and polypropylene, glass fiber filters, and ceramic materials, and the thickness of the separator may be from about 5 to about 50 μm, preferably from about 5 to about 25 μm.

The electrolyte solution is located between the positive electrode and the negative electrode, and the lithium-sulfur battery of the present invention uses the electrolyte solution described above.

The lithium-sulfur battery according to the present invention can be subjected to lamination (stacking) and folding processes of the separator and the electrode in addition to a general winding process.

The shape of the lithium-sulfur battery is not particularly limited, and may be various shapes such as a cylindrical shape, a laminate shape, and a coin shape.

Hereinafter, preferred examples of the present invention will be described in order to facilitate understanding of the present invention. It will be apparent to those skilled in the art, however, that the following examples are illustrative of the present invention and that various changes and modifications can be made within the scope and spirit of the present invention. It will be apparent that such variations and modifications are intended to be within the scope of the appended claims.

Positive Electrode for Lithium-Sulfur Battery

Example 1

0.5 g of carbon nanotubes was added to a solution prepared by dissolving polyvinylidene fluoride-hexafluoropropylene (Sigma Aldrich), which is a polymer having electrolyte solution impregnation property, to a mixed solvent of acetone and ethanol in an amount of 1.25% based on the total weight of the sulfur-carbon composite, and then the resulting solution was stirred at 25° C. and dried for 12 hours to form a polyvinylidene fluoride-hexafluoropropylene coating layer on the surface of the porous carbon material. At this time, the weight ratio of polyvinylidene fluoride-hexafluoropropylene:porous carbon material was 1:20. The porous carbon material refers to the total weight of the carbon nanotubes.

0.5 g of the porous carbon material coated with the polyvinylidene fluoride-hexafluoropropylene prepared above and 2 g of sulfur were uniformly mixed and then heat-treated at 155° C. for 30 minutes to obtain a sulfur-carbon composite which comprises sulfur, the porous carbon material and the polymer in a weight ratio of 75:23.75:1.25 of sulfur: the porous carbon material: the polymer.

The sulfur-carbon composite thus prepared, the conductive material, and the binder were mixed at a weight ratio of 90:5:5 of sulfur-carbon composite: the conductive material: the binder to prepare a slurry for forming a positive electrode active material layer, and then coated it on the current collector of aluminum foil with a thickness of 20 μm and dried at a temperature of 80° C. to produce a positive electrode for a lithium-sulfur battery.

At this time, carbon black was used as a conductive material, and styrene butadiene rubber and carboxymethyl cellulose were used as binders.

Example 2

A positive electrode for a lithium-sulfur battery was prepared in the same manner as in Example 1, except that polyvinylidene fluoride (Sigma Aldrich) is used as a polymer having electrolyte solution impregnation property.

Comparative Example 1

A positive electrode for a lithium-sulfur battery was prepared in the same manner as in Example 1, except that carbon nanotube without the coating layer is used.

Comparative Example 2

1 g of carbon nanotubes and 3 g of sulfur were uniformly mixed and then heat-treated at 155° C. for 30 minutes to prepare a sulfur-carbon composite.

Thereafter, 0.5 g of carbon nanotubes was added to a solution prepared by dissolving polyvinylidene fluoride-hexafluoropropylene (Sigma Aldrich), which is a polymer having electrolyte solution impregnation property, to a mixed solvent of acetone and ethanol in an amount of 1.25% based on the total weight of the sulfur-carbon composite, and then the resulting solution was stirred at 25° C. and dried for 12 hours to form a polymer coating layer on the surface of the porous carbon material.

The sulfur-carbon composite thus prepared, the conductive material, and the binder were mixed at a weight ratio of 90:5:5 of the sulfur-carbon composite: the conductive material: the binder to prepare a slurry for forming a positive electrode active material layer, and then coated it on the current collector of aluminum foil with a thickness of 20 μm and dried at a temperature of 80° C. to produce a positive electrode for a lithium-sulfur battery.

At this time, carbon black was used as a conductive material, and styrene butadiene rubber and carboxymethyl cellulose were used as binders.

Experimental Example 1: Measurement of Adhesive Force of Positive Electrode for Lithium-Sulfur Battery The positive electrodes for the lithium-sulfur battery prepared in Examples 1 and 2 and Comparative Example 1 were rolled at different roll-pressing gaps to produce positive electrodes for the lithium-sulfur batteries with porosities of 60%, 65%, and 72%, respectively.

The adhesive forces of the positive electrode for the lithium-sulfur battery of Examples 1 and 2, and Comparative Example 1 with porosities of 60%, 65%, and 72% were measured. The adhesive force of the positive electrode was measured by calculating the force when the positive electrode active material layer is dropped by pulling the electrode in a direction of 90 degrees using a Peel test equipment.

The adhesive force refers to the adhesive force of the positive electrode active material layer to the positive electrode current collector.

The results are shown in Table 1 and FIGS. 1 to 4.

TABLE 1

|  | Example 1 | Example 2 | Comparative Example 1 |
|---|---|---|---|
|  |  |  | (unit:gf/cm) |
| 60% | 2.95 | 3 | 1.75 |
| 65% | 3.25 | 3 | 1.52 |
| 72% | 1.15 | 0.82 | 0.95 |

As a result, in the case of low porosities of 60% and 65%, which are lower than the porosity of 68%, the adhesive forces of the positive electrode active material layer to the positive electrode current collector of Examples 1 and 2 comprising the sulfur-carbon composite of the present invention were superior to that of Comparative Example 1. In the case of the porosity of 65%, the result was about twice as good as that of Comparative Example 1.

On the other hand, in the case of the porosity of 72%, which is higher than the porosity of 68%, Comparative Example 1 and Example 1 showed similar values, and Example 2 was not superior to Comparative Example 1.

From the above results, it was confirmed that the sulfur-carbon composite of the present invention can increase the adhesive force between the positive electrode current collector and the positive electrode active material layer in the positive electrode with low porosity.

Experimental Example 2: Evaluation of Charging/Discharging Characteristic of Lithium-Sulfur Battery The positive electrodes of Examples 1 and 2 and Comparative Examples 1 and 2 having a porosity of 68% were used. A lithium-sulfur battery coin cell was manufactured using polyethylene as a separator and a lithium foil with a thickness of 150 μm as a negative electrode. At this time, the coin cell was manufactured using the electrolyte solution prepared by dissolving 1 M LiFSI and 1% LiNO$_3$ in the organic solvent of diethylene glycol dimethyl ether.

The manufactured coin cell was measured for capacity from 1.8 to 2.5 V using a charging-discharging measuring device (LAND CT-2001A, Wuhan, China). Specifically, the initial charging/discharging was performed at 0.1 C/0.1 C and then the charging/discharging cycles at 0.3 C/0.5 C were repeated 120 times to measure the discharging capacity.

Figure 1:
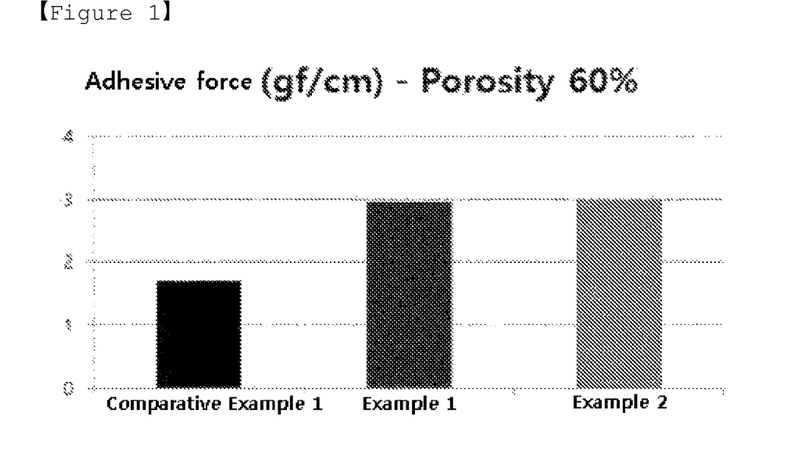
FIG. 1 is a graph showing the results of the adhesive force of the positive electrode active material layer to the current collector in the electrode with the porosity of 60%.
Figure 2:
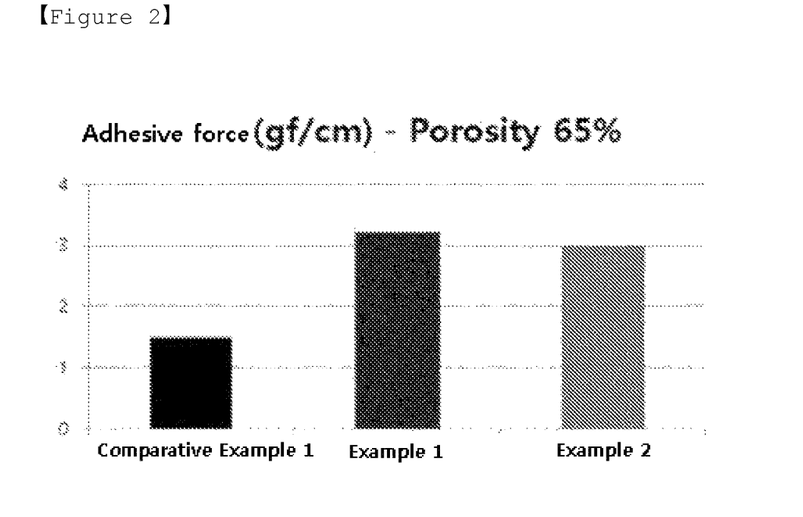
FIG. 2 is a graph showing the results of the adhesive force of the positive electrode active material layer to the current collector in the electrode with the porosity of 65%.
Figure 3:
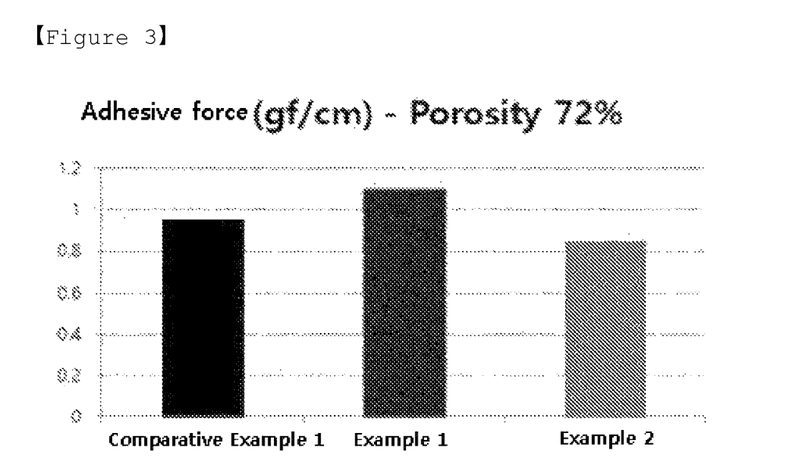
FIG. 3 is a graph showing the results of the adhesive force of the positive electrode active material layer to the current collector in an electrode with the porosity of 72%.
Figure 4:
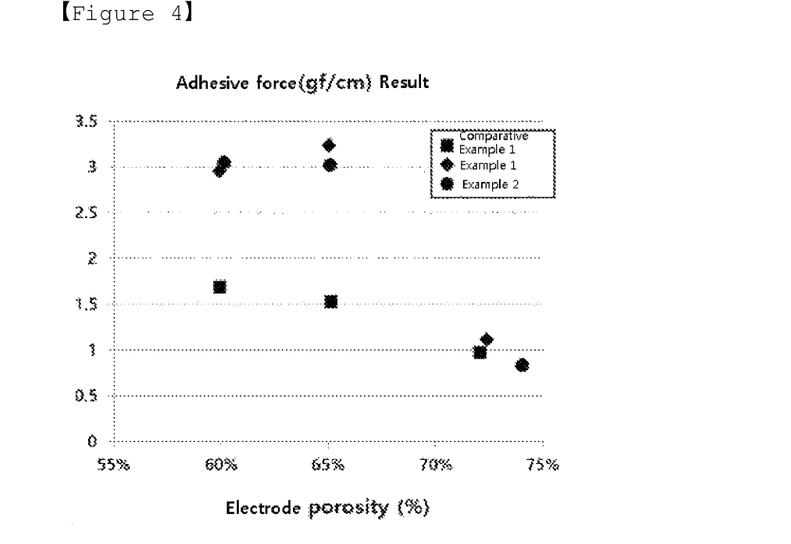
FIG. 4 is a graph showing the results of the adhesive force of the positive electrode active material layer to the current collector according to the porosity of the electrode.
Figure 5:
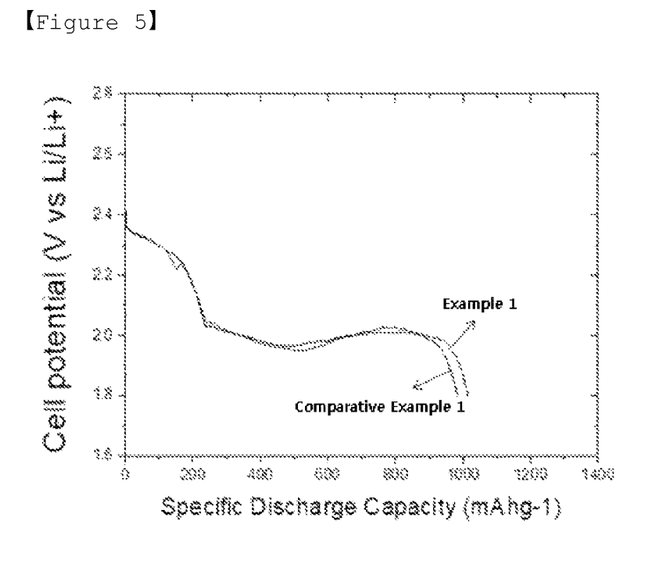
FIG. 5 is a graph showing discharge capacities of coin cells according to Experimental Example 2 of the present invention.

As a result, the coin cell capacity of Example 1 was superior to that of Comparative Example 1 (FIG. 5).

Figure 6:
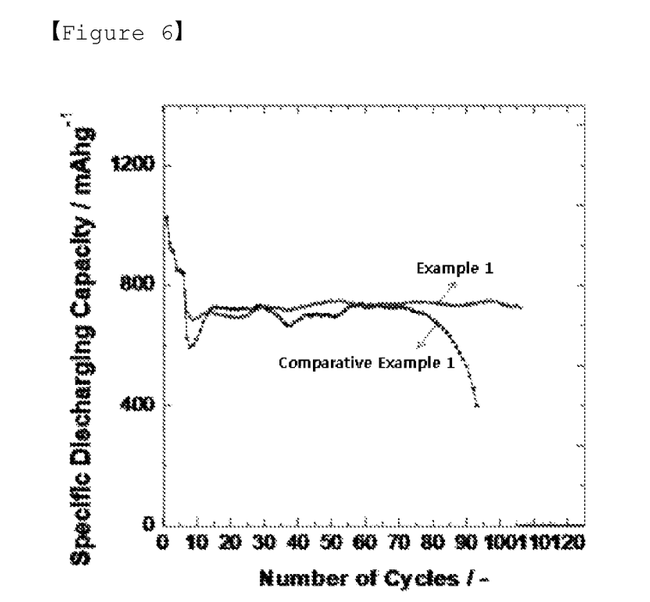
FIGS. 6 and 7 are graphs showing lifetime characteristic of the coin cell according to Experimental Example 2 of the present invention.
Figure 7:
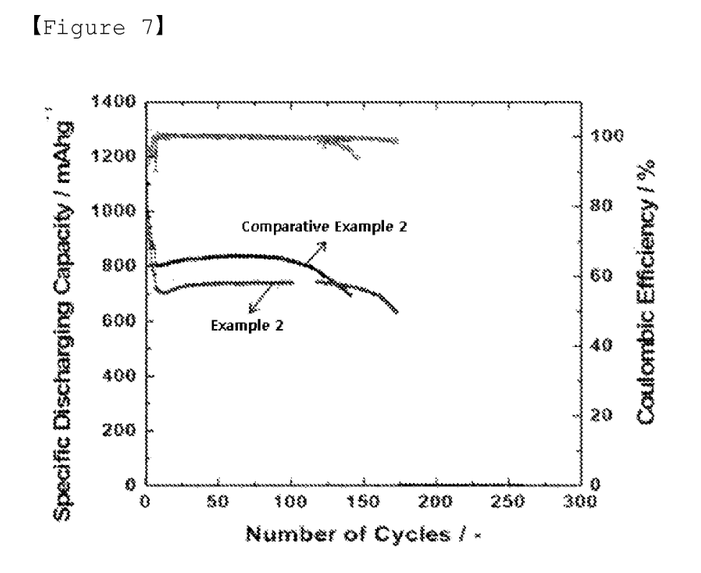

Also, it was confirmed that the coin cells of Examples 1 and 2 comprising the sulfur-carbon composite of the present invention maintain the constant discharging capacity even when the cycles are proceeded, but the discharging capacity of the coin cells of Comparative Examples 1 and 2 gradually decrease when the cycles are proceeded (FIGS. 6 and 7).

Accordingly, it was confirmed that the lithium-sulfur battery comprising the sulfur-carbon composite of the present invention has excellent performance and particularly excellent lifetime characteristic.

The invention claimed is:

1. A sulfur-carbon composite comprising:
    a porous carbon material;
    a coating layer on a surface of the porous carbon material, said coating layer comprising a compound with electrolyte solution impregnation property; and
    sulfur,
    wherein the surface of the porous carbon material comprises the coating layer;
    wherein the sulfur-carbon composite is prepared by mixing the porous carbon material having the coating layer with sulfur, and
    wherein the compound with electrolyte solution impregnation property is present in an amount of 0.5% by weight to 5% by weight based on a total weight of the sulfur-carbon composite.

2. The sulfur-carbon composite of claim 1, wherein the compound with electrolyte solution impregnation property has at least one form selected from the group consisting of polymer, oligomer, and monomolecular forms.

3. The sulfur-carbon composite of claim 2, wherein the compound with electrolyte solution impregnation property is in the polymer form, wherein the polymer comprises at least one selected from the group consisting of polyvinylidene fluoride, polyvinylidene fluoride-hexafluoropropylene, perfluoroalkyl, fluoroethylene propylene, ethylene tetrafluoroethylene, and polytetrafluoroethylene.

4. The sulfur-carbon composite of claim 3, wherein a solvent of the electrolyte solution in which the polymer has impregnation property comprises at least one solvent selected from the group consisting of an ether-based compound and a carbonate-based compound.

5. The sulfur-carbon composite of claim 4, wherein the compound has an electrolyte solution impregnation property of 200% or more.

6. A method for preparing a sulfur-carbon composite according to claim 1 comprising the steps of:
    (a) coating a porous carbon material with a compound having electrolyte solution impregnation property; and
    (b) mixing and molding the porous carbon material coated with the compound having electrolyte solution impregnation property prepared in step (a) and sulfur.

7. A positive electrode for a lithium-sulfur battery comprising a positive electrode current collector; and a positive electrode active material layer on the positive electrode current collector, wherein the positive electrode active material layer comprises the sulfur-carbon composite of claim 1, a conductive material, and a binder.

8. The positive electrode for the lithium-sulfur battery of claim 7, wherein the positive electrode has a porosity of 68% or less.

9. The positive electrode for the lithium-sulfur battery of claim 7, wherein an adhesive force of the positive electrode active material layer to the positive electrode current collector is 2 gf/cm or more.

10. A lithium-sulfur battery comprising a positive electrode; a negative electrode; a separator interposed between the positive electrode and the negative electrode; and an electrolyte solution, wherein the positive electrode is the positive electrode of claim 7.

11. The positive electrode for the lithium-sulfur battery of claim 9, wherein the adhesive force is 2 gf/cm to 15 gf/cm.

12. The positive electrode for the lithium-sulfur battery of claim 7, wherein the positive electrode has a porosity of 50% to 68%.

* * * * *